United States Patent
Lavastre et al.

(10) Patent No.: US 7,598,200 B2
(45) Date of Patent: Oct. 6, 2009

(54) IONIC LIQUIDS FOR HETEROGENISING METALLOCENE CATALYSTS

(75) Inventors: Olivier Lavastre, Gahard (FR); Fabien Bonnette, Bressuire (FR); Abbas Razavi, Mons (BE)

(73) Assignee: Total Petrochemicals Research Feluy, Feluy (BE)

( * ) Notice: Subject to any disclaimer, the term of this patent is extended or adjusted under 35 U.S.C. 154(b) by 13 days.

(21) Appl. No.: 10/591,408

(22) PCT Filed: Mar. 1, 2005

(86) PCT No.: PCT/EP2005/050859

§ 371 (c)(1),
(2), (4) Date: Jul. 19, 2007

(87) PCT Pub. No.: WO2005/085305

PCT Pub. Date: Sep. 15, 2005

(65) Prior Publication Data

US 2007/0270560 A1 Nov. 22, 2007

(30) Foreign Application Priority Data

Mar. 2, 2004 (EP) .................................. 04290571

(51) Int. Cl.
*C08F 4/642* (2006.01)
*C08F 4/649* (2006.01)
*C08F 4/6592* (2006.01)

(52) U.S. Cl. .................. 502/155; 502/103; 502/104; 502/123; 502/152; 502/167; 526/141; 526/160; 526/161; 526/165; 526/172

(58) Field of Classification Search .............. 526/160, 526/165, 141, 161, 172; 502/103, 104, 123, 502/152, 122, 167
See application file for complete search history.

(56) References Cited

U.S. PATENT DOCUMENTS 5,304,615 A 4/1994 Ambler et al.
5,994,602 A 11/1999 Sada et al.
6,340,716 B1 1/2002 Armand et al.
2002/0010291 A1 1/2002 Murphy

FOREIGN PATENT DOCUMENTS

WO   WO 01/81436   * 11/2001

OTHER PUBLICATIONS

Dupont Jairton, et al, "Ionic Liquid (Molton Salt) Phase Organometallic Catalysis", Chemical Reviews, American Chemical Society, vol. 102, No. 10, Oct. 2002, pp. 3667-3692.
Welton, Thomas, "Room-Temperature Ionic Liquids. Solvents for Synthesis and Catalysis", Chemical Reviews, American Chemical Society, vol. 99, 1999, pp. 2071-2083.

* cited by examiner

*Primary Examiner*—Caixia Lu
(74) *Attorney, Agent, or Firm*—Diane L. Kilpatrick-Lee

(57) ABSTRACT

The present invention discloses a method for preparing an heterogeniseded catalyst component comprising the steps of: a) providing a halogenated precursor component of formula (I) —X—[—CH$_2$]—CH$_3$ b) reacting the halogenated precursor with an ionic liquid precursor in a solvent to prepare an ionic liquid; IL$^+$X$^-$ c) optionally, reacting the intermediate IL$^+$X$^-$ with a salt C$^+$A$^-$, wherein C$^+$ is a cation that can be selected from K$^+$, Na$^+$, NH4$^+$, and A$^-$ is an anion that can be selected from PF$_6^-$, SbF$_6^-$, BF$_4^-$, (CF$_3$—SO$_2$)$_2$N$^-$ClO$_4$—, CF$_3$SO$_3^-$, NO$_3$— or CF$_3$CO$_2^-$. d) using the ionic liquid prepared in step b) to heterogenise a metallocene component of formula (II) R"(CpR''')(Cp'R'')MQ$_2$ wherein Cp and C'p are independently selected from substituted or unsubstituted cyclopentadienyl groups M is a metal selected from Group 4 of the Periodic Table, R" is a structural bridge imparting stereorigidity between Cp and Cp' and Q is a halogen or an alkyl having from 1 to 12 carbon atoms; e) heterogenising the ionic liquid/metal system by addition of an apolar solvent inducing the precipitation reaction; f) retrieving a metallocene catalyst component heterogenised by an ionic liquid. It also discloses an active catalyst system hetero genised by an ionic liquid and its use in the polymerisation of olefins.

20 Claims, No Drawings

IONIC LIQUIDS FOR HETEROGENISING METALLOCENE CATALYSTS

The present invention relates to the use of ionic liquids to heterogenise metallocene catalyst components and thus prepare catalyst systems that are very active for the polymerisation of olefins.

Ionic liquids have been described in literature such as for example in U.S. Pat. No. 5,994,602, or in WO96/18459 or in WO01/81353. They disclose various methods for preparing ionic liquids and various applications.

These applications comprise oligomerisation of ethene, propene or butene with various nickel-based precursors dissolved in ionic liquids as disclosed for example in Dupont et al. (Dupont, J., de Souza R. F., Suarez P. A. Z., in Chem. Rev., 102, 3667, 2002.). The same document also discloses that Ziegler-Natta type polymerisation can be carried out in dialkylimidazolium halides/ammonium halide ionic liquids using $AlCl_{3-x}R_x$ as cocatalysts.

Other applications include the use of ionic liquids that are liquid at or below room temperature as solvents for transition-metal-mediated catalysis, such as described for example in Welton (Welton T., in Chem. Rev., 99, 2071, 1999.). Most attempts have proven successful in dimerisation or oligomerisation, but polymerisation remains problematic, especially with metallocene catalyst components.

There is thus a need to develop new metallocene catalyst systems heterogenised by ionic liquids that are active in the polymerisation of alpha-olefins.

It is an aim of the present invention to provide a method for preparing a metallocene catalyst component heterogenised by an ionic liquid.

It is another aim of the present invention to provide a metallocene catalyst component heterogenised by an ionic liquid.

It is a further aim of the present invention to provide a process for polymerising alpha-olefins using a metallocene catalyst component heterogenised by an ionic liquid.

It is also an aim of the present invention to prepare new polymers with said new catalyst system.

Accordingly, the present invention discloses a method for preparing an heterogenised metallocene catalyst component for the polymerisation of alpha-olefins that comprises the steps of:

a) providing a halogenated precursor component of formula (I)

$$X-[-CH_2-]-CH_3 \quad (I)$$

b) reacting the halogenated precursor with an ionic liquid precursor in a solvent to prepare an ionic liquid;

$$IL^+X^-$$

c) optionally, reacting the intermediate $IL^+X^-$ with a salt $C^+A^-$, wherein $C^+$ is a cation that can be selected from $K^+$, $Na^+$, $NH_4^+$, and $A^-$ is an anion that can be selected from $PF_6^-$, $SbF_6^-$, $BF_4^-$, $(CF_3-SO_2)_2N^-$, $ClO_4^-$, $CF_3SO_3^-$, $NO_3^-$ or $CF_3CO_2^-$.

d) using the ionic liquid obtained in step b) or c) to heterogenise a complex of formula (II)

$$R''(CpR''')(Cp'R'')MQ_2 \quad (II)$$

wherein Cp and C'p are independently selected from substituted or unsubstituted cyclopentadienyl groups M is a metal selected from Group 4 of the Periodic Table, R" is a structural bridge imparting stereorigidity between Cp and Cp' and Q is a halogen or an alkyl having from 1 to 12 carbon atoms and wherein the amounts of ionic liquid and catalyst components are in a molar ratio (ionic liquid)/(catalyst component) of from 5:1 to 1:5;

e) heterogenising the ionic liquid/metal system by addition of an apolar solvent inducing the precipitation reaction;

f) retrieving a metallocene catalyst component heterogenised by an ionic liquid.

Preferably, the ionic liquid and catalyst components are in stoichiometric amounts.

The groups $(CpR''')$ and $(Cp'R'')$ may include substituted or unsubstituted indenyl or fluorenyl groups. The position and nature of the substituents $R'''$ and $R''$ is not particularly limited.

Preferably, the metallocene catalyst component is a bis-indenyl, a bis-benzindenyl or a bis-tetrahydroindenyl, substituted or unsubstituted.

Particularly suitable metallocene catalyst components can be selected from ethylene bis-terahydroindenyl zirconium dichloride, or dimethylsilyl bis(2-Me-benzindenyl) zirconium dichloride or dimethylsilyl bis(2-Me-4-Ph-indenyl) zirconium dichloride.

All reactions are carried under argon at atmospheric pressure, using the standard Schlenk or glovebox techniques.

In the ionic liquid, the anion $X^-$ can be selected from $Cl^-$, $Br^-$, $I^-$, $BF_4^-$, $PF_6^-$, $AsF_6^-$, $SbF_6^-$, $NO_2^-$ and $NO_3^-$. It can also be selected from compounds of formula $AlR_{4-z}A''_z$ wherein R can be selected from an alkyl having from 1 to 12 carbon atoms, substituted or unsubstituted, or from a cycloalkyl having 5 or 6 carbon atoms, substituted or unsubstituted, or from an heteroalkyl, substituted or unsubstituted, or from an heterocycloalkyl, substituted or unsubstituted, or from an aryl having 5 or 6 carbon atoms, substituted or unsubstituted, or from an heteroaryl, substituted or unsubstituted, or from an alkoxy, an aryloxy, an acyl, a silyl, a boryl, a phosphino, an amino, a thio or a seleno, wherein A" is a halogen and wherein z is an integer from 0 to 4. The cationic part of the ionic liquid may be prepared by protonation or alkylation of a compound selected from imidazole, pyrazoline, thiazole, triazole, pyrrole, indone, tetrazole, pyridine, pyrimidine, pyrazine, pyridazine, piperazine or piperidine.

Preferably, the anion $X^-$ is $Br^-$ or $BF_4^-$, and preferably the cationic part is derived from imidazolium or pyridinium.

If the ionic liquid precursor is N-alkyl-imidazolium, the reaction is carried out at a temperature of from 50 to 150° C., preferably of from 80 to 120° C. and for a period of time of from 1 to 24 hours, preferably of from 2 to 6 hours. The resulting intermediate product is an ion pair of formula III

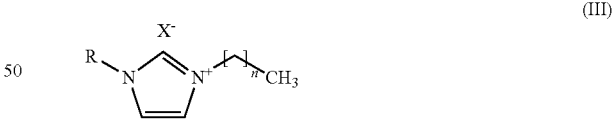

(III)

If the ionic liquid precursor is pyridinium, the reaction is carried out at a temperature of from 50 to 120° C., preferably of from 90 to 110° C. and for a period of time of from 1 to 24 hours, preferably of about 2 hours. The resulting product is an ion pair of formula IV

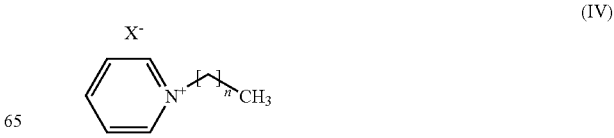

(IV)

The intermediate products III or IV are then mixed with a complex of formula R" (CpR''') (Cp'R") M Q₂ in a solvent selected typically from CH₂Cl₂, THF, or toluene, at room temperature (about 25° C.), for a period of time of from 1 to 24 hours, preferably of from 1 to 2 hours. After evaporation, the resulting product is precipitated in an apolar solvent to give a catalytic component of formula V if the ionic liquid precursor is a N-alkyl-imidazolium

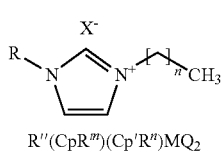

R"(CpR^m)(Cp'R^n)MQ₂

(V)

or of formula VI if the ionic liquid is pyridinium

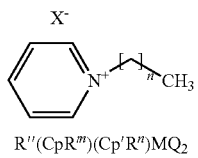

R"(CpR^m)(Cp'R^n)MQ₂

(VI)

The apolar solvent is selected in order to induce precipitation of the catalyst component: it can be heptane for example.

Optionally, the intermediate product (III) or (IV) can be reacted with a salt C⁺A⁻, wherein C⁺ is a cation that can be selected from K⁺, Na⁺, NH₄⁺, and A⁻ is an anion that can be selected from PF₆⁻, SbF₆⁻, BF₄⁻, (CF₃—SO₂)₂N⁻, ClO₄⁻, CF₃SO₃⁻, NO₃⁻ or CF₃CO₂⁻. The reaction is carried out in a solvent selected typically from CH₂Cl₂, THF or CH₃CN at a temperature of from 50 to 80° C., preferably of about 60° C. and for a period of time of from 6 to 48 hours, preferably of from 16 to 24 hours.

The mixing with the complex is then carried out as previously leading to an ion pair representing a supported catalytic component of formula VII if the ionic liquid is N-alkyl-imidazolium

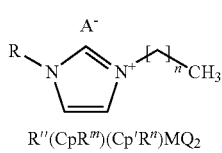

R"(CpR^m)(Cp'R^n)MQ₂

(VII)

or of formula VIII if the ionic liquid is pyridinium

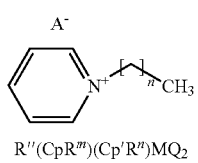

R"(CpR^m)(Cp'R^n)MQ₂

(VIII)

The present invention also discloses a catalytic component heterogenised by an ionic liquid, obtainable by the method described here-above.

An active catalyst system heterogenised by an ionic liquid is then obtained by addition of an activating agent.

The activating agent can be selected from aluminoxanes or aluminium alkyls or boron-based activating agents.

The aluminium alkyls are of the formula $AlR_x$ and can be used wherein each R is the same or different and is selected from halides or from alkoxy or alkyl groups having from 1 to 12 carbon atoms and x is from 1 to 3. Especially suitable aluminiumalkyl are dialkylaluminum chloride, the most preferred being diethylaluminum chloride (Et₂AlCl).

The preferred aluminoxanes comprise oligomeric linear and/or cyclic alkyl alumoxanes represented by the formula:

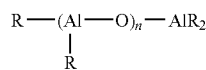

for oligomeric, linear aluminoxanes and

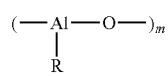

for oligomeric, cyclic aluminoxanes, wherein n is 1-40, preferably 10-20, m is 3-40, preferably 3-20 and R is a $C_1$-$C_8$ alkyl group and preferably methyl.

Methylaluminoxane (MAO) is preferably used.

Suitable boron-based activating agents may comprise triphenylcarbenium boronate such as tetrakis-pentafluorophenyl-borato-triphenylcarbenium [C (Ph)₃⁺ B(C₆F₅)₄⁻] as described in EP-A-0,427,696

Other suitable boron-containing activating agents are described in EP-A-0,277,004.

The amount of activating agent is such that the Al/M ratio is of from 100 to 1000.

The present invention further provides a method for homopolymerising or for copolymerising alpha-olefins that comprises the steps of:

a) injecting an apolar solvent into the reactor, then the catalytic component heterogenised by an ionic liquid and activated by a activating agent;

b) injecting the monomer and optional comonomer into the reactor;

c) maintaining under polymerisation conditions;

d) retrieving the polymer under the form of particles.

The conditions of temperature and pressure for the polymerisation process are not particularly limited.

The pressure in the reactor can vary from 0.5 to 50 bars, preferably from 1 to 20 bars and most preferably from 4 to 10 bars.

The polymerisation temperature can range from 10 to 100° C., preferably from 20 to 70° C. and most preferably at room temperature (about 25° C.).

The solvent is apolar and is typically selected from an alkane, preferably n-heptane.

The reaction is carried out for a period of time of from 30 minutes to 24 hours.

The monomers that can be used in the present invention are alpha-olefins having from 2 to 8 carbon atoms, preferably ethylene and propylene.

EXAMPLES

Synthesis of Heterogenised Catalyst Components using Different Ionic Liquids Synthesis of 1-methyl-3-pentylimidazolium bromide (IL1)III)

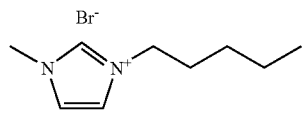

9.96 mL of N-methylimidazole (125 mmole) were introduced in a Schlenk followed by 22.16 mL of bromopentane (187.5 mmoles). The reaction medium was stirred during 2 hours at a temperature of 90° C. After cooling down to room temperature, 40 mL of diethylic ether were added, to form a white precipitate. After filtration, the precipitate was washed 4 times with 40 mL of diethylic ether. After filtration, 24.7 g of a white solid were obtained with a yield of 85%.

The NMR spectra were as follows:
$^1$H NMR (300 MHz, CDCl$_3$) δ: 10.23 (s, 1), 7.63 (tr, 1), 7.47 (tr, 1), 4.27 (tr, 2), 1.86 (q, 2), 1.29 (m, 4), 0.82 (tr, 3).
$^{13}$C NMR (75 MHz, CDCl$_3$) δ: 137.17, 123.77, 122.09, 50.01, 36.67, 29.92, 28.17, 21.98, 13.76.

Synthesis of N-pentylpyridinium Bromide (IL2) (IV):

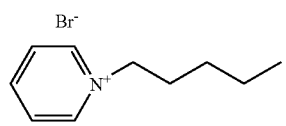

0.4 mL of pyridine (5 mmoles) were introduced in a Schlenk followed by 0.8 mL of bromopentane (7.5 mmoles). The reaction medium was stirred during 2 hours at a temperature of 100° C. until formation of a precipitate. After cooling down to room temperature, the precipitate was washed 3 times with 5 mL of diethylic ether. After filtration and drying under reduced pressure, 1.09 g of a cream-coloured solid were obtained with a yield of 95%.

The NMR spectra were as follows:
$^1$H NMR (300 MHz, CDCl$_3$) δ: 9.58 (d, 2), 8.52 (tr, 1), 8.11 (tr, 2), 4.93 (tr, 2), 1.98 (q, 2), 1.28 (m, 4), 0.77 (tr, 3).
$^{13}$C NMR (75 MHz, CDCl$_3$) δ: 145.18, 128.47, 61.80, 31.66, 27.92, 22.02, 13.75.

Synthesis of the System Catalyst Component/Ionic Liquid

One micromole of the metallocene catalyst component ethylene bis-tetrahydroindenyl zirconium dichloride (THI) was dissolved in 1 mL of CH2Cl2 to which was added one micromole of the ionic liquid dissolved in 1 mL of the same solvent. The reaction medium was kept under stirring at room temperature (about 25° C.) for a period of time of one hour. The solvent was then eliminated under reduced pressure. A yellow oil was obtained. 60 mL of n-heptane were added to allow the formation of a yellow precipitate that could easily be injected into the reaction zone (The n-heptane phase was colourless).

Polymerisation of propylene.

Example 1

The polymerisation conditions were as follows:
1 μmole of catalyst component ethylene bis-tetrahydroindenyl zirconium dichloride (THI) and 1 μmole of ionic liquid were mixed with 1000 equivalents of methylaluminoxane (MAO)

60 mL of n-heptane were added to allow the formation of a yellow precipitate that could easily be injected into the reaction zone (The n-heptane phase was colourless).

propylene was injected into the reactor and the system was maintained at a temperature of 70° C. and under a pressure of 5 bars during a period of time of one hour.

the solvent was then eliminated and the residue was treated with 100 mL of acid methanol (10 vol % HCl), then washed with water and dried under vacuum.

Example 2

The polymerisation conditions of example 1 were repeated with 1 μmole of catalyst component Me$_2$Si(2-Me-4-Ph-Ind)$_2$ZrCl$_2$ (cata 2) except that for the washing step 200 mL of acid methanol were used because a larger amount of polymer was obtained.

As reference example, the same amount of THI was activated with the same amount of MAO, but no ionic liquid was used.

The ionic liquids were respectively 1-methyl-3-pentylimidazolium bromide (IL1) and N-pentylpyridinium bromide (IL2)

The results are summarised in Table I.

TABLE I

| Catalytic system | Mass of polymer (g) | C$_3$H$_6$ consumption (tons C$_3$H$_6$/mol/h) | Tf (° C.) |
|---|---|---|---|
| THI | 4.47 | 4.6 | |
| THI + 1 equ. IL1 | 3.85 | 4.9 | |
| THI + 1 equ. IL2 | 4.52 | 4.9 | |
| cata 2 | 20.1 | 14.3 | 156.7 |
| cata 2 + 1 equ. IL1 | 19.6 | 13.6 | 154.6 |

As can be seen from Table I, the presence of the ionic liquid leads to a similar catalyst activity. The polymers obtained with the ionic liquid system had substantially the same structure and the same fusion temperature as those obtained with conventional metallocene catalyst systems. In addition, the use of ionic liquids allows the preparation of a powder in n-heptane that is easily injected into the reactor.

The invention claimed is:

1. A method for the preparation of heterogenised catalyst component comprising:
   a) providing a halogenated precursor component characterized by the formula:

X[CH$_2$]$_n$CH3tm (I)

b) reacting the halogenated precursor with an ionic liquid precursor IL to prepare an ionic liquid of the formula:

IL$^+$X$^-$ c) mixing in a solvent the ionic liquid IL$^+$X$^-$ with a metallocene catalyst component of the formula:

R"(Cp)(Cp')M Q$_2$ (II)

wherein:
   Cp and Cp' are each independently a substituted or unsubstituted cyclopentadienyl group, M is a metal from Group 4 of the Periodic Table, R" is a structural bridge imparting stereorigidity between Cp and Cp' and Q is a halogen or an alkyl having from 1 to 12 carbon atoms
   wherein the amounts of ionic liquid and catalyst component are in a molar ratio (ionic liquid)/(catalyst component) of from 5:1 to 1:5;

d) heterogenising the ionic liquid/metallocine system of subparagraph c) by addition of an apolar solvent to induce a precipitation reaction; and e) retrieving a metallocene catalyst component heterogenised by said ionic liquid.

2. The method of claim 1 wherein the ionic liquid precursor is an N-hydrocarbyl imidazole or pyridine.

3. The method of claim 2 wherein the ionic liquid and the catalyst component are mixed in approximately equal stoichiometric amounts.

4. The method of claim 2 wherein said ionic liquid precursor is an N—R imidazole in which R is an aryl group or an alkyl group having from 1-12 carbon atoms.

5. The method of claim 2 wherein the ionic liquid precursor is 1-methyl-3-pentylimidazolium bromide or N-pentyl pyridinium bromide.

6. The method of claim 1 further comprising prior to subparagraph c) reacting said ionic liquid with an ionic compound characterized by the formula $C^+A^-$ wherein $C^+$ is a cation selected from the group consisting of $K^+$, $Na^+$, $NH_4^+$, and $A^-$ is an anion selected from the group consisting of $PF_6^-$, $SbF_6^-$, $BF_4^-$, $(CF_3-SO_2)N^-$, $ClO_4^-$, $CF_3-SO_3)_2N^-$, $ClO_4^-$, $CF_3SO_3^-$, $NO_3^-$ or $CF_3CO_2^-$.

7. The method of claim 1 wherein the solvent of subparagraph c) is selected from a group consisting of tetrahydrofuron, methylene dichloride, and toluene.

8. The method of claim 7 wherein said apolar solvent is a liquid alkane.

9. The method of claim 8 wherein said apolar solvent is n-heptane.

10. The method of claim 7 further comprising subsequent to subparagraph c) and prior to subparagraph d) evaporating at least a portion of said solvent prior to the addition of said apolar solvent.

11. The method of claim 1 wherein the ligand structure of said metallocene catalyst component incorporates a substituted or unsubstituted bis-indenyl ligand structure, a substituted or unsubstituted bis-benzindenyl ligand structure, or a substituted or unsubstituted bis-tetrahydroindenyl ligand structure.

12. The method of claim 11 wherein said metallocene catalyst component is an ethylene bis-tetrahydroindenyl zirconium dichloride, dimethyl silyl bis(2-methylbenzindenyl zirconium dichloride, or dimethyl silyl (2-methyl-4-phenylindenyl zirconium dichloride.)

13. A heterogenized metallocene catalyst component produced by the method of claim 1.

14. A heterogenized catalyst system comprising the catalyst component of claim 13 and an activating agent.

15. The catalyst system of claim 14 wherein the activating agent is methylaluminoxane and Q is halogen.

16. The catalyst system of claim 15 wherein the methylaluminoxane is present in an amount to provide an Al/M ratio within the range of 100 to 1,000.

17. A method for the preparation of an alpha olefin polymer comprising:

a) providing a heterogenized catalyst system comprising a heterogenized catalyst component produced by the process of claim 13 and an activating agent for said catalyst component;

b) introducing said heterogenised catalyst system in an apolar solvent and an alpha olefin monomer into a polymerization reactor;

c) operating said reactor under polymerization conditions; and d) recovering an alpha olefin polymer product from said reactor.

18. The method of claim 17 wherein said alpha olefin monomer comprises ethylene or propylene.

19. The method of claim 18 wherein said apolar solvent is n-heptane.

20. The method of claim 17 wherein said activating agent is methylalumoxane and wherein said ionic liquid precursor is 1-methyl-3-pentylimidazolium bromide or N-pentyl pyridinium bromide.

* * * * *